July 13, 1937.  L. ADKISSON ET AL  2,086,835
POWER TRANSMITTING MECHANISM
Filed Nov. 9, 1935   2 Sheets-Sheet 1
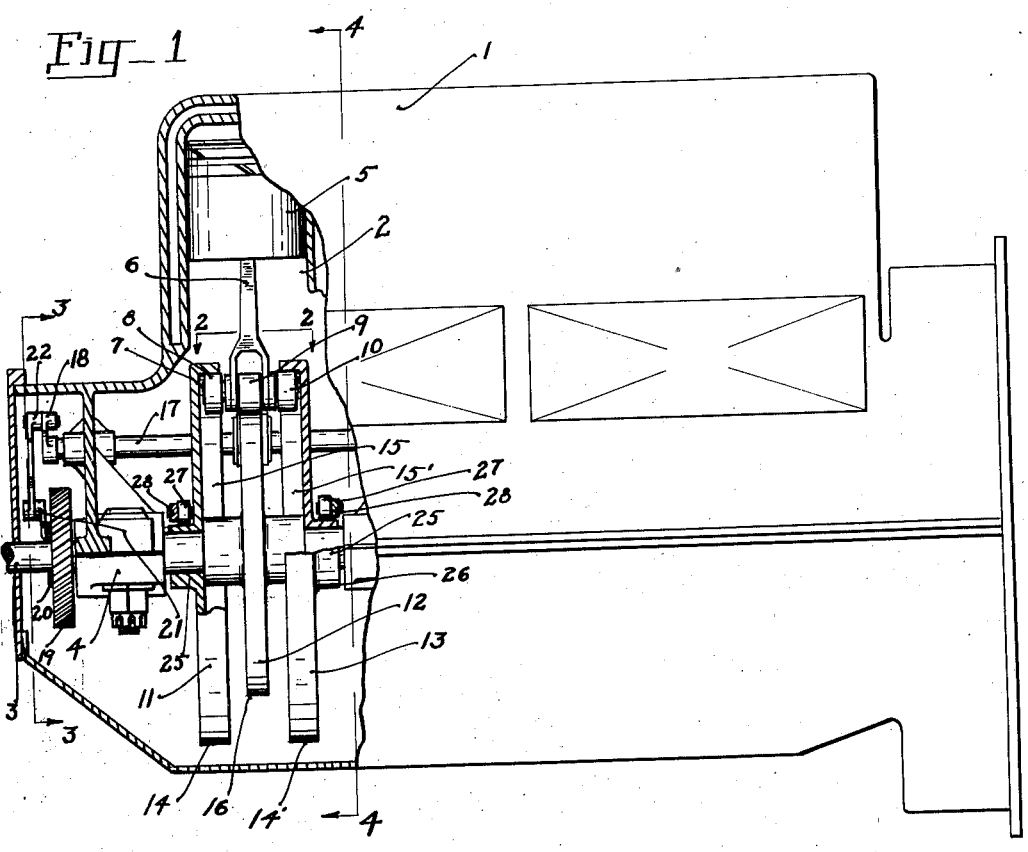
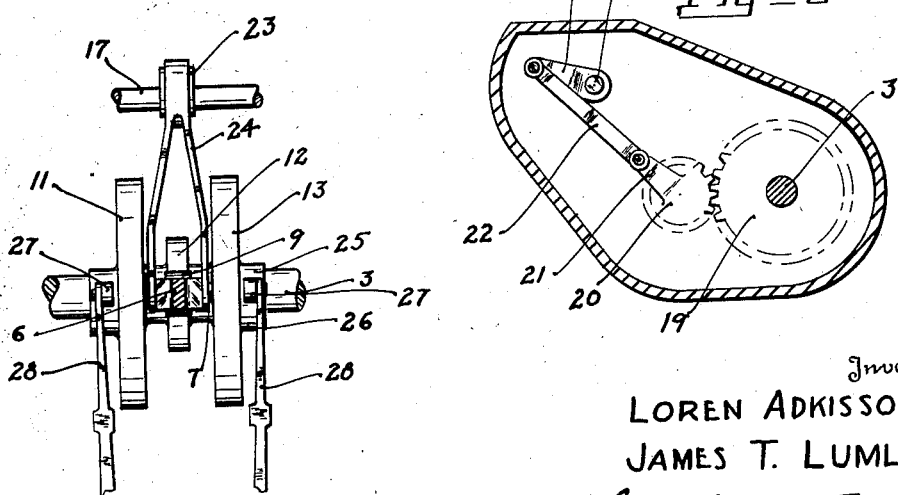
Inventor
LOREN ADKISSON
JAMES T. LUMLEY

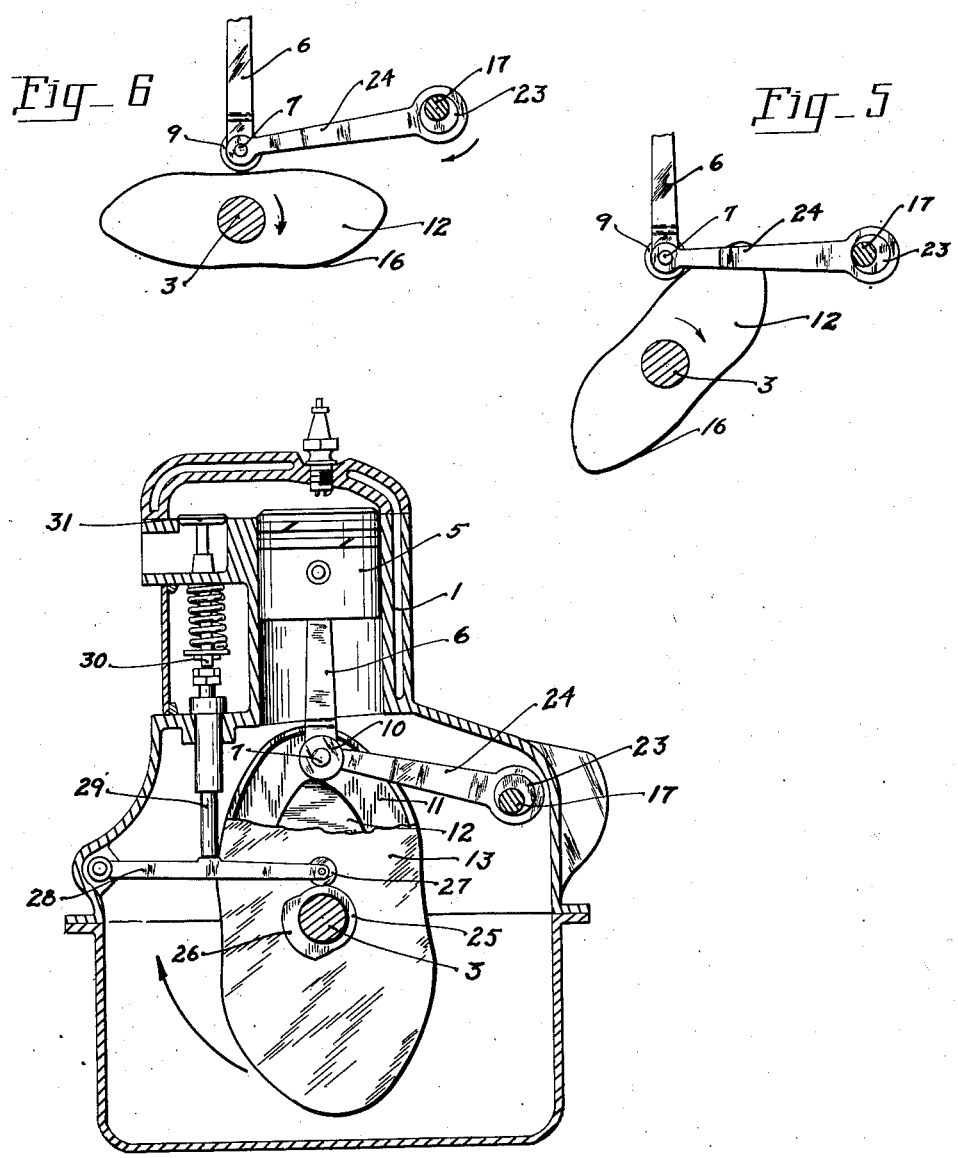

Patented July 13, 1937

2,086,835

UNITED STATES PATENT OFFICE 2,086,835

POWER TRANSMITTING MECHANISM

Loren Adkisson and James T. Lumley, The Dalles, Oreg.

Application November 9, 1935, Serial No. 49,052

5 Claims. (Cl. 74—55)

Our invention relates to means for converting reciprocating motion into rotary and vice versa. Specifically the invention relates to means for converting the reciprocating action of a piston of a reciprocating type engine into rotary motion as identified in a driving shaft through the employment of cam members in substitution for the usual cranks.

An object of the invention resides in providing cam members instead of cranks on the driving shaft of an engine and connecting the connecting rods associated with the pistons thereof to the cam members so that the reciprocating movement of such rods rotates the cam members and consequently rotates the driving shaft.

An object of the invention is to provide means for holding the connecting rods in a straight line movement, that is to say the rod does not deviate from axial alignment with the cylinder with which it is associated, thereby avoiding the usual loss of power occasioned in the common type of connecting rod.

A further object of the invention is to provide a simple and efficient valve operating mechanism.

These and other objects of the invention will be explained in the accompanying specification and illustrated in the accompanying drawings, wherein—

Figure 1 is a side elevation of an explosive engine with the forward end thereof in section illustrating the invention as it appertains to one cylinder thereof.

Figure 2 is the sectional view indicated by section lines 2—2 in Figure 1.

Figure 3 is the section view indicated by section lines 3—3 in Figure 1.

Figure 4 is the section view indicated by section line 4—4 in Figure 1.

Figures 5 and 6 are diagrammatic views illustrating two phases of the operation of the present invention.

In the drawings 1 indicates a gasoline motor, 2 the forward cylinder thereof, 3 the driving shaft which is analogous to a crank shaft and 4 the bearing supporting such shaft.

Operating in cylinder 2 is a piston 5 to which is connected the upper end of a connecting rod 6. The lower end of the rod is forked and receives a pin 7 upon which is rotatably mounted the rolls 8, 9, and 10.

Mounted to shaft 3 are three cam wheels 11, 12 and 13. Wheels 11 and 13 are identical with one another but reversed and each is provided with a cam flange 14 and 14' respectively, having an inner cam face 15 and 15' respectively which follow the same configuration as the outer peripheral cam face 16 of wheel 12. Figures 5 and 6 show the general configuration of the cams as shown by the perimeter 16 of cam wheel 12. The rolls 8, 9 and 10 respectively engage and travel the cam faces 15, 16 and 15'.

Paralleling the driving shaft 3 is a guide shaft 17 which is provided with a crank 18 at its forward end. A gear 19 is secured on shaft 3 and this meshes with a lesser gear 20 mounted to the frame of motor 1. Gear 20 has a crank 21 which is connected to crank 18 by means of the link 22. Crank 21 is shorter than crank 18 and hence as gear 20 rotates crank 21 imparts an oscillating movement to crank 18 and shaft 17.

Mounted to shaft 17 is an eccentric 23 and connected to this eccentric is one end of the guide rod 24 the other end of which is forked and secured to the pin 7 at the lower end of connecting rod 6.

The cam wheels 11 and 13 are provided with hubs 25 having cams 26 which are engaged by the rolls 27 at one end of the rocker arms 28 the other end of which arms are pivoted to the frame of motor 1. As shaft 3 is rotated arms 28 are intermittently raised and lowered by the cams. This raises and lowers the tappet rods 29 which in turn raise and lower the stems 30 of valves 31 thus unseating and seating such valves. These valves control the exhaust and inlet to the cylinder 2 above the piston 5.

The cam portions of the cam wheels 11, 12, and 13 are somewhat elongated following the contour of the cam wheel shown in Figures 5 and 6. In operation it is contemplated that the engine will be provided with a suitable carburetion and ignition system, which forming no part of the present invention are not shown. In Figures 4, 5 and 6 are shown three phases of the operation of the invention. Figure 4 shows the end of the compression stroke, the rolls 8, 9 and 10 riding upon the cam faces 15, 16 and 15' force the connecting rod 6 and piston 5 upwardly, as they rotate in the direction indicated by the large arrow. The rolls have reached the upper ends of the cam faces and are about to travel downward. Figure 5 shows the next step wherein the roll 9 bears down upon the cam face under force of exploding fuel in cylinder 5. Figure 6 shows the last stage wherein the piston and connecting rods are at their low points of travel ready to be moved toward the upper end of the cylinder through the action of the cam. During each full rotation of the cam wheels the piston and connecting rod move up and down twice.

One upward movement may be employed to scavenger gases from the cylinder, and the other to compress explosive fuel, while one downward movement will be a power stroke.

In operation the power strokes are delivered to the cam face 16, while the cam faces 15 and 15' serve to secure roll 9 in engagement with cam face 16.

We desire to call particular attention to the operation of the shaft 17, eccentric 23 and guide rod 24 and their particular purpose and object in this invention. In viewing Figures 4 to 6 it may be noted that upon a downward stroke of the piston and connecting rod under power impulse the connecting rod will attempt to move sideways with the cam wheels thus dissipating the power generated. The connecting rod should travel in a straight line in alignment with the axis of the cylinder and the piston. Guideways may be provided therefor, but these are objectionable for the reason that the space they occupy interferes with the operation of the cam wheels. It is for this purpose that the guide rod is provided. The guide rod, inasmuch as it is pivoted to eccentric 23, is pivoted to a constantly changing pivotal point. As the rolls 8, 9 and 10 approach a horizontal plane midway between the upper and lower extremities of piston and connecting rod stroke the pivotal point moves away from the line of movement of the connecting rod. On the other hand as the rolls depart from such plane, the pivotal point approaches such line of movement. This maintains the connecting rod constantly in alignment with the axis of the cylinder and the piston. This is accomplished by means of the gears 19 and 20, cranks 18 and 21, link 22 and shaft 17. This shaft is constantly rocked back and forth. This of course rocks the eccentric 23 back and forth, and inasmuch as guide rod 24 is connected to the eccentric it moves back and forth, or to be more exact, the center of its pivotal connection moves back and forth in conformity to the movement of the eccentric. The terms pivotal point and pivotal center as herein employed are the same.

We are aware that others have employed cam wheels, cam members and cams in connection with reciprocating bodies for transforming reciprocating motion into rotary motion, and vice versa. We are also aware that others have employed combinations of opposite traveling cam members or stationary guides in an endeavor to maintain a straight line of travel for piston rods. However we believe we are the first to employ the new and novel combination of elements to achieve the objects and purpose herein set forth.

While a specific form of the improvement has been described and illustrated herein, it is desired to be understood that the same may be varied, within the scope of the appended claims, without departing from the spirit of the invention.

Having described our invention, we claim:

1. In an engine, a reciprocating piston, a connecting rod associated therewith and cam wheels driven by the connecting rod, and means for maintaining the connecting rod constantly in a straight line of movement embodying a rocking shaft, an eccentric mounted thereto and a guide rod having one end connected to the eccentric and the other connected to the connecting rod.

2. A steadier for connecting rods driving cam members and vice versa, comprising a rocking shaft, an eccentric mounted thereon, a guide having one end mounted about the eccentric and the other end pivotally connected to the connecting rod.

3. In an engine, a cylinder, a piston reciprocable therein, a connecting rod having one end connected to the piston, a drive shaft, cam wheels mounted thereon, rolls at the other end of the connecting rod engaging and driving the cam wheels, a second shaft, a connection between first and second shaft to rock the second shaft, an eccentric mounted upon the second shaft, and a guide rod having one end mounted about the eccentric and the other end pivotally connected to the connecting rod.

4. In an engine, a cylinder, a piston reciprocable therein, a connecting rod having one end connected to the piston, a drive shaft, a cam wheel mounted thereon and driven by the connecting rod, a second shaft, a connection between first and second shafts to rock the second shaft, an eccentric mounted upon the second shaft, and a guide rod having one end mounted about the eccentric and the other end pivotally connected to the connecting rod.

5. In an engine, a cylinder, a piston reciprocable therein, a connecting rod having one end connected to the piston, a drive shaft, a cam member mounted thereon and driven by the connecting rod, a rocking shaft, an eccentric mounted upon the rocking shaft, and a guide rod having one end mounted about the eccentric and the other end pivotally connected to the connecting rod.

LOREN ADKISSON.
JAMES T. LUMLEY.